United States Patent [19]
Montgomery

[11] Patent Number: 5,825,143
[45] Date of Patent: Oct. 20, 1998

[54] METHOD AND APPARATUS FOR SLOWING BACK SPIN OF A ROD STRING OF A PROGRESSING CAVITY PUMP POWERED BY AN ELECTRIC MOTOR WHEN POWER IS LOST

[75] Inventor: Randy Montgomery, Edmonton, Canada

[73] Assignee: Lord Electrical Industrial Distributors Ltd, Edmonton, Canada

[21] Appl. No.: 736,341

[22] Filed: Oct. 23, 1996

[30] Foreign Application Priority Data

Oct. 26, 1995 [CA] Canada .................................. 2161504

[51] Int. Cl.⁶ ...................................................... H02P 3/00
[52] U.S. Cl. ........................... 318/381; 318/375; 318/760
[58] Field of Search .................................. 318/757–765, 318/362–382

[56] References Cited

U.S. PATENT DOCUMENTS

| | | | |
|---|---|---|---|
| 4,195,255 | 3/1980 | Guttmann | 318/762 |
| 4,410,845 | 10/1983 | Lockyear | 318/459 |
| 4,476,423 | 10/1984 | Mallick | 318/800 |
| 4,990,844 | 2/1991 | Gritter et al. | 318/762 |
| 5,198,734 | 3/1993 | Johnson | 318/369 |
| 5,551,510 | 9/1996 | Mills | 166/68 |
| 5,653,290 | 8/1997 | Bland | 166/381 |

OTHER PUBLICATIONS

Article Watch for flying parts pp. 16 and 17 published in Occupational health and Safety Magazine May 1995.

*Primary Examiner*—David S. Martin
*Attorney, Agent, or Firm*—Anthony R. Lambert

[57] ABSTRACT

A method and apparatus for slowing back spin of a rod string of a progressing cavity pump powered by an electric motor when power is lost. Pulse direct current voltage into the windings of the electric motor powering the progressing cavity pump to magnetize a stator of the electric motor thereby reducing the rotational speed of a rotor of the electric motor and consequently the rotational speed of the back spinning rod string of the progressing cavity pump.

5 Claims, 3 Drawing Sheets

5,825,143

METHOD AND APPARATUS FOR SLOWING BACK SPIN OF A ROD STRING OF A PROGRESSING CAVITY PUMP POWERED BY AN ELECTRIC MOTOR WHEN POWER IS LOST

A method and apparatus for slowing back spin of a rod string of a progressing cavity pump powered by an electric motor when power is lost

FIELD OF THE INVENTION

The present invention relates to a method and apparatus for slowing back spin of a rod string of a progressing cavity pump powered by an electric motor when power is lost.

BACKGROUND OF THE INVENTION

Progressing cavity pumps are rotary pumps in which a drive motor rotates a corkscrew like string of rods, termed the "rod string". Due to their configuration they are sometimes referred to as a "screw pump". These pumps are commonly used in the oil industry to pump oil from oil wells, as they are considered a cost efficient and energy efficient pumping alternative.

When the progressing cavity pump is in operation, the rod string becomes twisted around and around in the same fashion as an elastic. For example, a 1000 meter rod string can have more than 100 turns. Should a power failure occur the 100 turns of the rod string will start to unwind. The unwinding of the rod string is accelerated by the weight of the 1000 meter column of fluid that was being lifted immediately prior to power being lost. It has been estimated that rod strings reach speeds in excess of 5000 rotations per minute (rpm). The drive motors used to power progressing cavity pumps are generally configured on a four to one gear ratio. The drive motor will rotate four times for every one rotation of the rod string. This means that when the rod string is unwinding at a speed of 5000 rpm, the drive motor is being turned backwards at a speed of 20,000 rpm. Most drive motors are designed to rotate at a maximum speed of 1200 rpm. When a drive motor is rotated backwards at speeds that far exceed its design capabilities, it has a tendency to explode, propelling parts and debris outwardly at speeds in excess of 150 miles per hour.

SUMMARY OF THE INVENTION

What is required is a method and apparatus for slowing back spin of a rod string of a progressing cavity pump powered by an electric motor when power is lost.

According to one aspect of the present invention there is provided a method for slowing back spin of a rod string of a progressing cavity pump powered by an electric motor when power is lost. Pulse direct current voltage into the windings of the electric motor powering the progressing cavity pump to magnetize a stator of the electric motor thereby reducing the rotational speed of a rotor of the electric motor and consequently the rotational speed of the back spinning rod string of the progressing cavity pump.

Although beneficial results may be obtained through the use of the method, as described, even more beneficial results may be obtained when the pulsing of direct current voltage is varied with frequency feed back from regenerated voltage of the electric motor.

According to another aspect of the present invention there is provided an apparatus for slowing back spin of a rod string of a progressing cavity pump powered by an electric motor when power is lost. The apparatus includes a self contained direct current power source. Means is provided for pulsing output from the direct current power source into the electric motor to magnetize a stator of the electric motor in accordance with the teachings of the method.

The apparatus, as described above, is capable of safely bringing a back spinning rod string to a complete stop. There are a variety of pulsing means that can be utilized, the preferred form of pulsing means being a power transistor.

Although beneficial results may be obtained through the use of the apparatus, as described above, it is preferred that means be provided for varying the frequency of pulsing output of the means for pulsing the direct current power source as the rotational speed of the back spinning rod string increases and decreases. This can be accomplished by including a microprocessor that receives frequency feed back from regenerated voltage of the electric motor and controls the pulsing output of the pulsing means. With these types of controls in place the microprocessor can initiate pulsing of direct current voltage as soon as power is lost, vary the pulsing with increases or decreases in the speed of the back spinning rod string, and terminate pulsing once the back spinning of the rod string has stopped.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
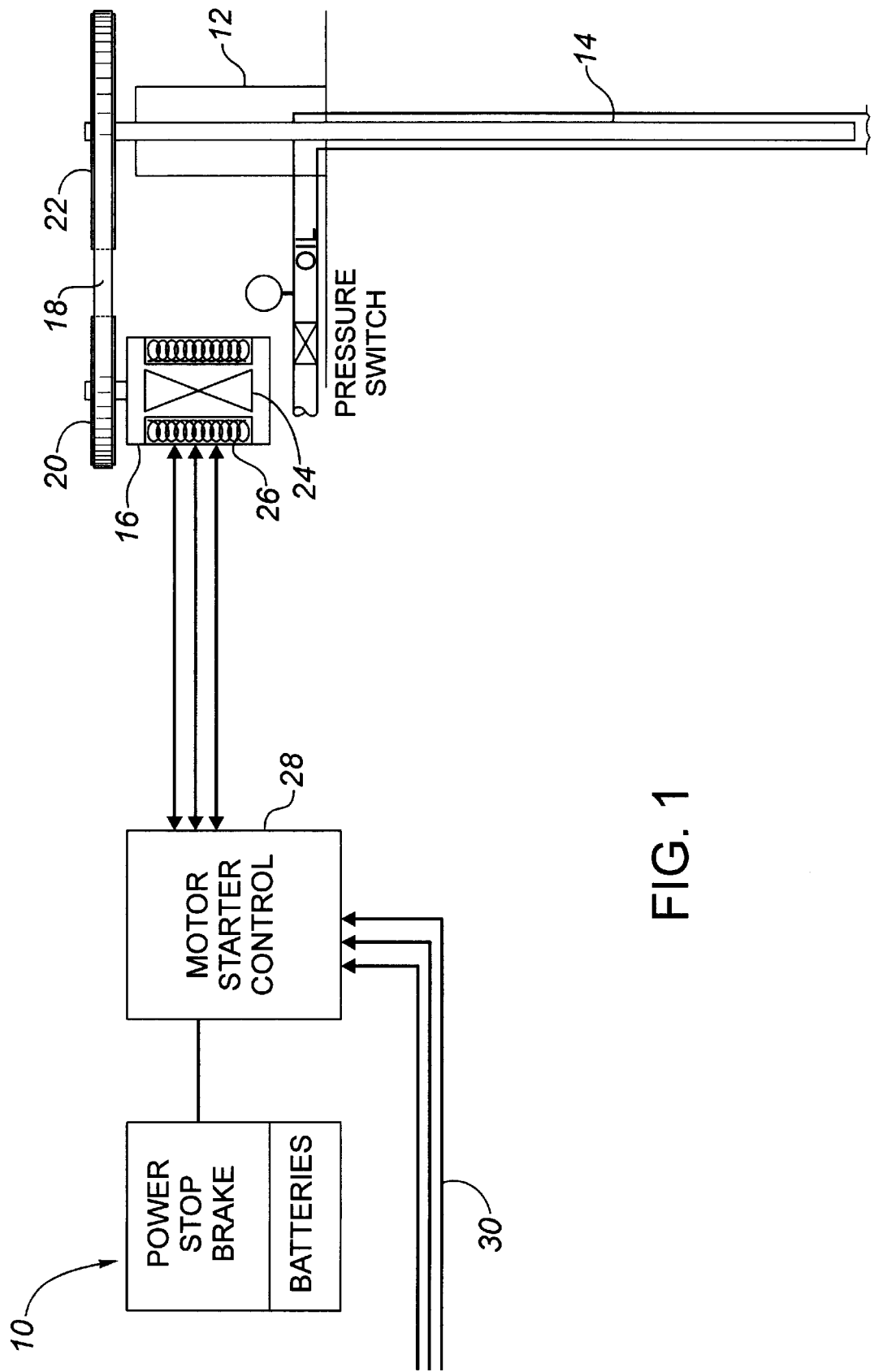
FIG. 1 is a block diagram illustrating the preferred method for slowing back spin of a rod string of a progressing cavity pump powered by an electric motor when power is lost.

The preferred embodiment, an apparatus for slowing back spin of a rod string of a progressing cavity pump powered by an electric motor when power is lost, generally identified by reference numeral 10, will now be described with reference to FIGS. 1 through 3.

FIG. 1 illustrates the manner in which apparatus 10 is connected at a pump installation site. A progressing cavity pump 12 is illustrated that has a depending rod string 14. Progressive cavity pump 12 is coupled with and derives its power from an electric motor 16. The means for coupling progressive cavity pump 12 with electric motor 16 is a conventional arrangement in which a belt 18 is mounted between two pulleys 20 and 22. Electric motor 16 is of conventional construction and has a rotor 24 and a stator 26. Electric motor 16 is electrically coupled with a motor starting unit 28 which, in turn, derives its power through power connection lines 30 from a main power source (not shown). Apparatus 10 is intended for connection to both motor starting unit 28 and electric motor 16. Should power be lost, apparatus 10 will provide alternate power, as will hereinafter be further described.

Figure 2:
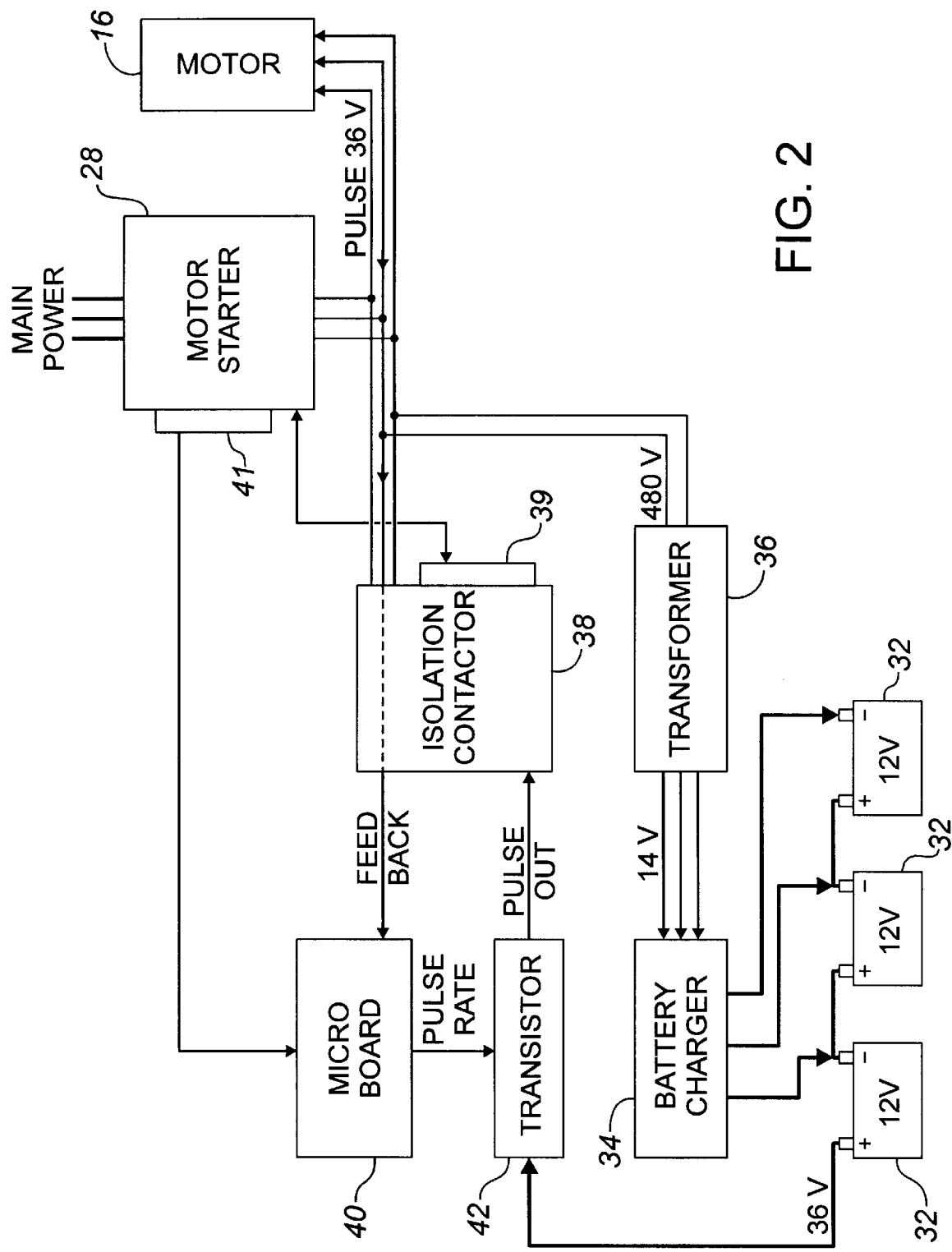
FIG. 2 is a block diagram illustrating the preferred apparatus for slowing back spin of a rod string of a progressing cavity pump powered by an electric motor when power is lost.

Referring to FIG. 2, the internal components of apparatus 10 and their manner of connection with motor starting unit 28 and electric motor 16, are illustrated. A plurality of 12 volt batteries 32 are provided. Preferably deep cycle batteries are used that provide a longer time duration of voltage power. Batteries 32 are connected in series to provide a self contained direct current power source. Batteries 32 are, in turn, connected to a battery charging unit 34. Battery charging unit 34 is connected via transformer 36 with power connection lines 30. Apparatus 10 is connected to electric motor 16 in a conventional manner through an isolation contactor 38. Isolation contactor 38 has an auxiliary contact 39, the purpose of which will hereinafter be further described. A microcontroller board 40 is provided. Microcontroller board 40 receives inputs from motor starter unit 28 and from isolation contactor 38. Microcontroller board 40 provides outputs to a power transistor 42. Power transistor 42 is connected to batteries 32 and pulses output from batteries 32. Microcontroller board 40 is connected to motor starter unit 28 via an auxiliary contact 41.

Figure 3:
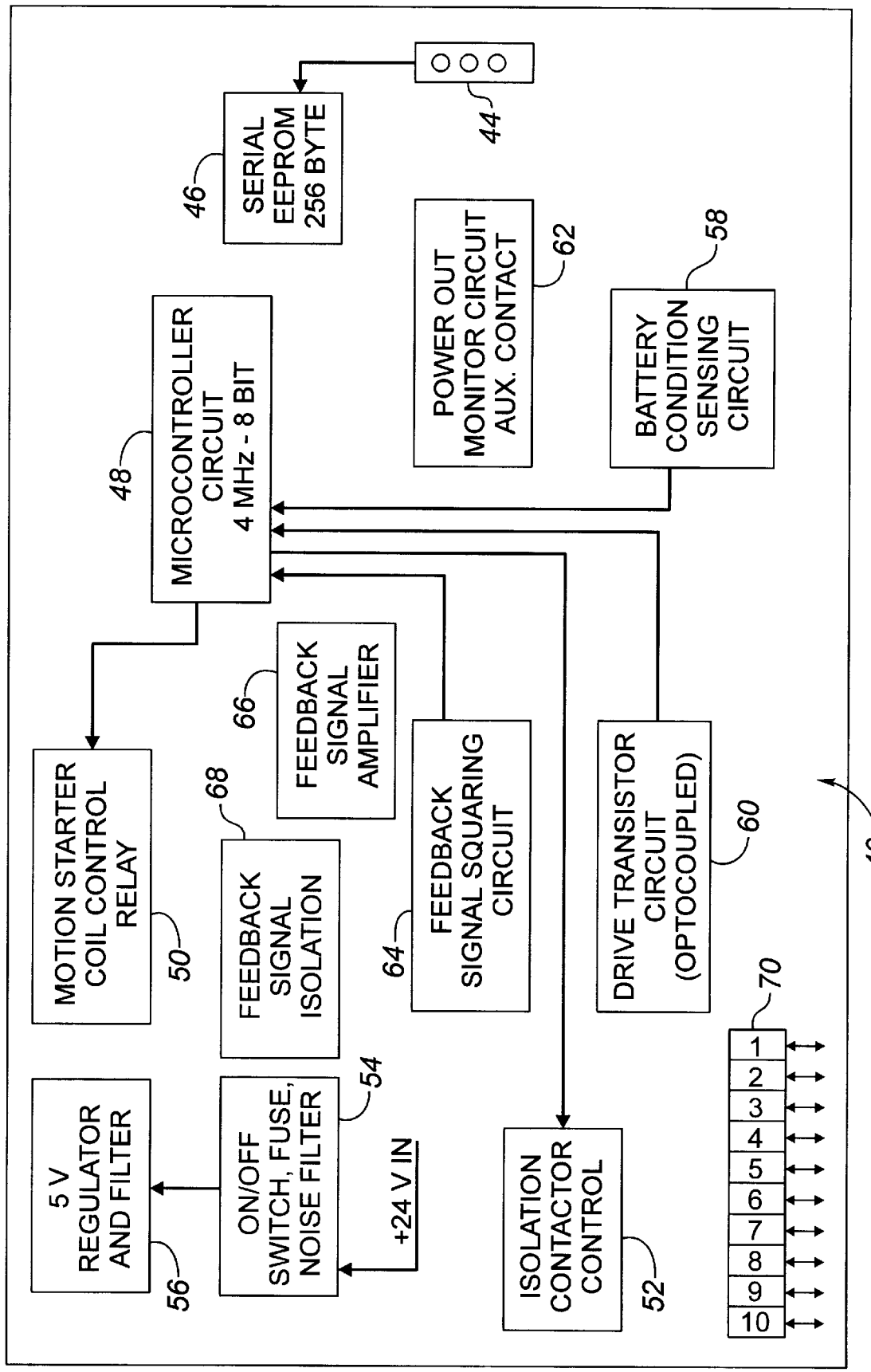
FIG. 3 is a detailed block diagram of a microcontroller board illustrated in FIG. 2.

Referring to FIG. 3, detail is provided regarding microcontroller board 40. Microcontroller board 40 includes a serial programming port 44, a 256 byte eeprom 46, and a 4 MHz/8 bit microcontroller circuit 48. The outputs from microcontroller circuit 48 include a motor starter coil control relay circuit 50 and an isolation contactor control circuit 52. Connected to isolation contactor control circuit 52 are a 24 volt circuit 54 with on/off switch, fuse and noise filter and a 5 volt regulator 56 with filter. The inputs into microcontroller circuit 48 include a battery condition sensing circuit 58, an optocoupled drive transistor circuit 60, an optocoupled power out monitoring circuit 62 and a feedback signal monitoring circuit 64. Feedback signal monitoring circuit 64 has input from a feedback signal amplifier 66 which, in turn, has input from a feedback signal isolation circuit 68. Microcontroller board 40 has a terminal block 70 which has 10 inputs and outputs: (1) power transistor base out, (2) 24 volt power in, (3) ground, (4) 12 volt power in, (5) starter auxiliary contact in, (6) feedback signal in, (7) feedback signal in, (8) isolation contactor coil out, (9) motor coil circuit in, (10) motor coil circuit out.

The use and operation of apparatus 10 in accordance with the teachings of the preferred method will now be described. The function of microcontroller board 40 is to monitor a loss of power and then immediately actuate and control pulsed 36 volt direct current into stator 26 of electric motor 16. When power is lost to motor starter unit 28, auxiliary contact 41 to microcontroller board 40 opens. Upon receiving a signal that auxiliary contact 41 has opened, microcontroller board 40 signals isolation contactor 38 to close and signals power transistor 42 to pulse direct current through isolation contactor 38. By monitoring frequency feedback from regenerated voltage of electric motor 16 (typically in a range of 200 to 400 millivolts), microcontroller board 40 is able to determine what pulse frequency is appropriate in view of the spin back speed of rod string 14. This feedback frequency signal is generated by residual rotor magnetism. In normal operation progressing cavity pump 12 rotates at 430 rotations per minute. This speed is, preferably, used as a maximum allowable pump spinback speed. Microcontroller will always adjust the pulse frequency to maintain the pump spinback speed at 430 rotations per minute. The feedback frequency signal from the motor regenerated voltage is amplified and resampled until the frequency rate is at a comparable point to 430 rotations per minute at which point microcontroller board 40 will terminate pulsing voltage to electric motor 16. It is important that progressing cavity pump 12 not be restarted when direct current is being applied by apparatus 10. This is prevented by normally closed auxiliary contact 39 on isolation contactor 38 and by motor starter coil control relay circuit 50 on microcontroller board 40. Once spinback has been reduced to below the set point of 430 r.p.m. for progressing cavity pump 12, microprocessor board will continue to sample spinback speed, as determined by the feedback frequency signal from electric motor 16, until rod string 14 of progressing cavity pump 12 has come to a complete stop. After a delay of approximately 13 seconds, apparatus 10 will de-energize allowing normal operation of progressing cavity pump 12.

It will be apparent to one skilled in the art from the above description, that the controlled pulsed direct current slows back spin of rod string 14 of progressing cavity pump 12 in a smooth controlled manner. Only after the backspin energy is depleted will apparatus 10 allow alternating current power to be restored and electric motor 16 to be restarted. It will also be apparent to one skilled in the art that modifications may be made to the illustrated embodiment without departing from the spirit and scope of the invention as hereinafter defined in the claims.

The Embodiments of the invention in which an exclusive property or privilege is claimed are defined as follows:

1. A method for slowing back spin of a rod string of a progressing cavity pump powered by an electric motor when power is lost, comprising the steps of:

pulsing direct current voltage into the stator windings of the electric motor powering the progressing cavity pump to magnetize a stator of the electric motor thereby reducing the rotational speed of a rotor of the electric motor and consequently the rotational speed of the back spinning rod string of the progressing cavity pump, and varying the frequency of pulsing output of the direct current voltage as the rotational speed of the back spinning rod string increases and decreases.

2. An apparatus for slowing back spin of a rod string of a progressing cavity pump powered by an electric motor when power is lost, comprising:

a self contained direct current power source;

means for pulsing output from the direst current power source into an electric motor to magnetize a stator of the electric motor; and means for varying a frequency of pulsing output of the means for pulsing output from the direct current power source as the rotational speed of the back spinning rod string increases and decreases.

3. The apparatus as defined in claim 2, wherein the pulsing means is a power transistor.

4. The apparatus as defined in claim 3, wherein the means for varying the frequency of the pulsing output of the pulsing means includes a microprocessor that receives frequency feed back from regenerated voltage of the electric motor and controls the pulsing output of the pulsing means.

5. An apparatus for slowing back spin of a rod string of a progressing cavity pump powered by an electric motor when power is lost, comprising:

a plurality of 12 volt batteries connected in series to provide a self contained direct current power source;

a power transistor for pulsing output from the direct current power source; and a microprocessor connected to both the power transistor and the electric motor, the microprocessor controlling the power transistor to vary the frequency of pulsing output from the direct current power source as the rotational speed of the back spinning rod string increases based upon frequency feed back from regenerated voltage of the electric motor.

\* \* \* \* \*